United States Patent [19]

Yamamori et al.

[11] 4,271,721

[45] Jun. 9, 1981

[54] HOUSING FOR FRONT-DRIVE AUTOMATIC TRANSMISSION FOR TRANSVERSE ENGINE OF AUTOMOTIVE VEHICLE

[75] Inventors: Takahiro Yamamori, Tokyo; Kazuyoshi Iwanaga; Kunio Ohtsuka, both of Yokohama, all of Japan

[73] Assignee: Nissan Motor Company, Limited, Yokohama, Japan

[21] Appl. No.: 947,128

[22] Filed: Sep. 29, 1978

[51] Int. Cl.³ .................... F16H 37/08; F16H 57/02
[52] U.S. Cl. .................................. 74/695; 74/606 R
[58] Field of Search .................. 74/606 R, 695, 730, 74/732, 752 A, 752 C, 760

[56] References Cited

U.S. PATENT DOCUMENTS

| Re. 20,149 | 10/1936 | Padgett et al. | 74/606 X |
|---|---|---|---|
| 3,095,764 | 7/1963 | Peras | 74/695 X |
| 3,274,848 | 9/1966 | Konrad et al. | 74/731 X |
| 3,491,621 | 1/1970 | Moan | 74/695 X |
| 3,614,902 | 10/1971 | Candellero | 74/730 X |
| 3,800,626 | 4/1974 | Koiyunen | 74/695 |
| 3,802,294 | 4/1974 | Smirl | 74/682 X |
| 3,986,413 | 10/1976 | Stockton | 74/695 X |

*Primary Examiner*—Lawrence J. Staab
*Attorney, Agent, or Firm*—Thompson, Birch, Gauthier & Samuels

[57] ABSTRACT

Front-drive automatic transmission includes an output gear positioned between a planetary gear system and a hydrokinetic torque converter. A differential is provided to deliver torque from the output gear to each of two axle shafts. A transmission case for the planetary gear system and a torque converter housing for the torque converter are connected to each other to define an interface which lies in a plane disposed outboard of the inboard face of the output gear with respect to the gear system. The transmission case is formed with a valve cover attachment surface which extends up to a location adjacent the plane.

5 Claims, 10 Drawing Figures

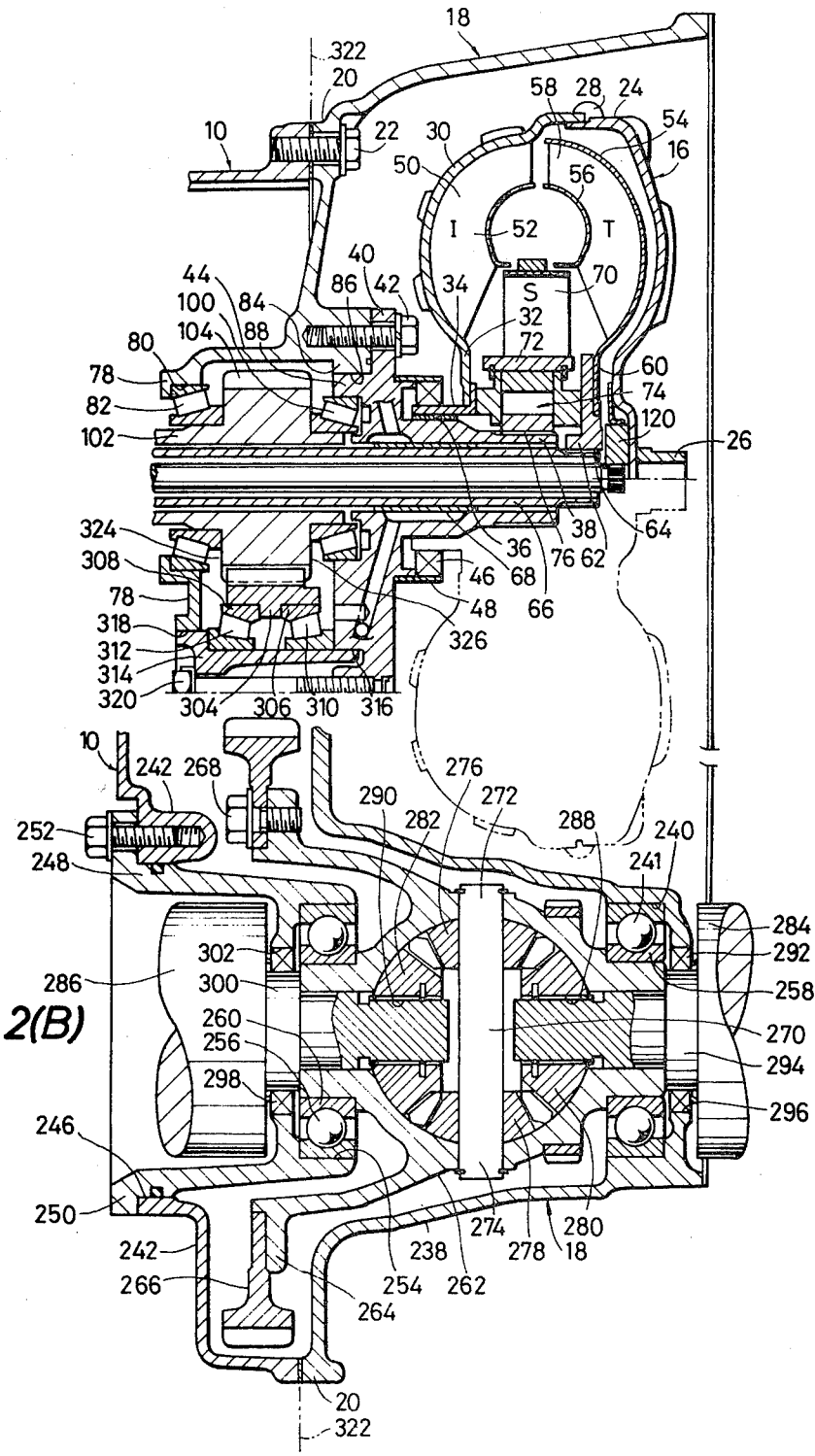

HOUSING FOR FRONT-DRIVE AUTOMATIC TRANSMISSION FOR TRANSVERSE ENGINE OF AUTOMOTIVE VEHICLE

BACKGROUND OF THE INVENTION

The present invention relates to a housing for a front-drive automatic transmission for a transverse engine of an automotive vehicle.

In a front-drive system there are known two methods of mounting an engine. One of them is to mount an engine longitudinally and the other to mount an engine transversely. A transverse engine is advantageous in a front-drive system of an automotive vehicle, particularly a subcompact vehicle and a mini vehicle, in terms of weight distribution between front and rear wheels and of space saving.

A known front-drive automatic transmission for a transverse engine is known in which an engine, a hydrokinetic torque converter, a planetary gear system or gear box and a differential are arranged one after another. With this arrangement, the overall longitudinal length from the engine to the differential is long so that two different in length axle shafts have to be employed to deliver torque from the differential to the front wheels.

Therefore, it is advantageous to arrange an output gear between a hydrokinetic torque converter and a planetary gear system so as to permit a differential to be arranged at a location spaced substantially equidistant from front wheels. This arrangement will permit the use of axle shafts of the same length.

It is earnestly requested a transmission case be formed with a valve cover attachment surface sufficiently large enough to permit the attachment of a large valve cover that covers a considerable number of valves or devices.

According to a known housing, a transmission case and a torque converter housing are connected to each other to define an interface which lies in a plane disposed inboard of the inboard face of the output gear with respect to the planetary gear system, and the torque converter housing includes a housing portion in which a differential drivably connected to the output gear is mounted. This housing portion includes a first wall remote from the transmission case and a second wall adjacent the transmission case. The first wall rotatably supports a portion of the differential and the second wall rotatably supports another portion of the differential. The housing portion is formed with a side opening for installation of the differential in assembly and a separate side closure wall closes the side opening.

This known housing has a shortcoming that the transmission has a shorter longitudinal length so that a sufficiently large area may not be set aside as a valve cover attachment surface, thereby making it difficult to design a valve system. Another shortcoming is that since it is very difficult to strengthen that wall of the housing portion which is disposed adjacent the transmission case by means of ribs, this wall is structurally weak. Still another shortcoming is that the side closure wall is necessary in addition to the transmission case and the torque converter housing, thereby increasing the number of steps in assembly and manufacturing cost.

SUMMARY OF THE INVENTION

An object of the present invention is to increase a valve case attachment surface formed on a transmission case for a given overall longitudinal length of a housing including the transmission case and the cooperating torque converter housing.

Another object of the present invention is to provide a housing, including a transmission case and a torque converter housing, which gives a good rigidity.

Further object of the present invention is to provide a housing, including a transmission case and a torque converter housing, which has fewer parts.

Still further object of the present invention is to provide a housing, including a transmission case and a torque converter housing, which is easy to assemble.

Still further object of the present invention is to provide a housing, including a transmission case and a torque converter housing, which can be manufactured easily and at a reduced cost.

BRIEF DESCRIPTION OF THE DRAWINGS

In the accompanying drawings:

FIGS. 1(A) and 1(B) in combination represent a sectional view taken through line I—I of FIG. 4 showing an automatic transmission embodying the present invention;

FIGS. 2(A) and 2(B) in combination represent a sectional view taken through line II—II of FIG. 4 showing a differential embodying the present invention;

DESCRIPTION OF PREFERRED EMBODIMENT

Figure 5:
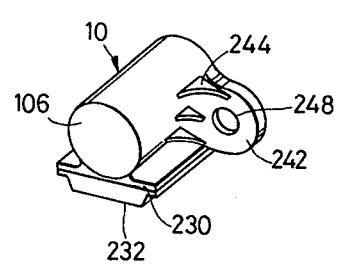
FIG. 5 is a schematic perspective view of the transmission case shown in FIG. 1.
Figure 6:
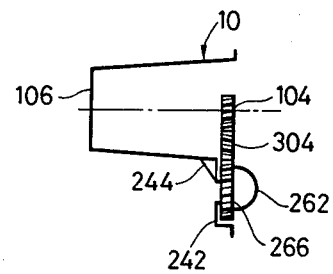
FIG. 6 is a schematic longitudinal sectional view of the transmission case shown in FIG. 1.
Figure 7:
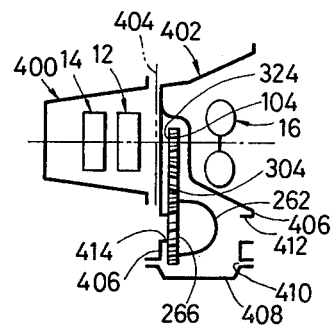
FIG. 7 is a schematic view of a conventional automatic transmission and differential.
Figure 8:
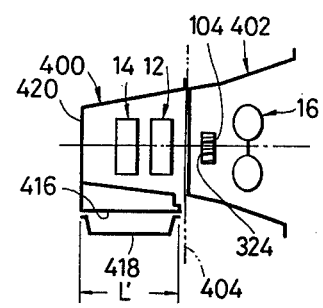
FIG. 8 is a schematic longitudinal sectional view similar to FIG. 3 showing the conventional automatic transmission.

Referring to the accompanying drawings, FIGS. 1 to 6 show a preferred embodiment of the invention, while FIGS. 7 and 8 show the most pertinent prior art to the invention.

Figure 1A:
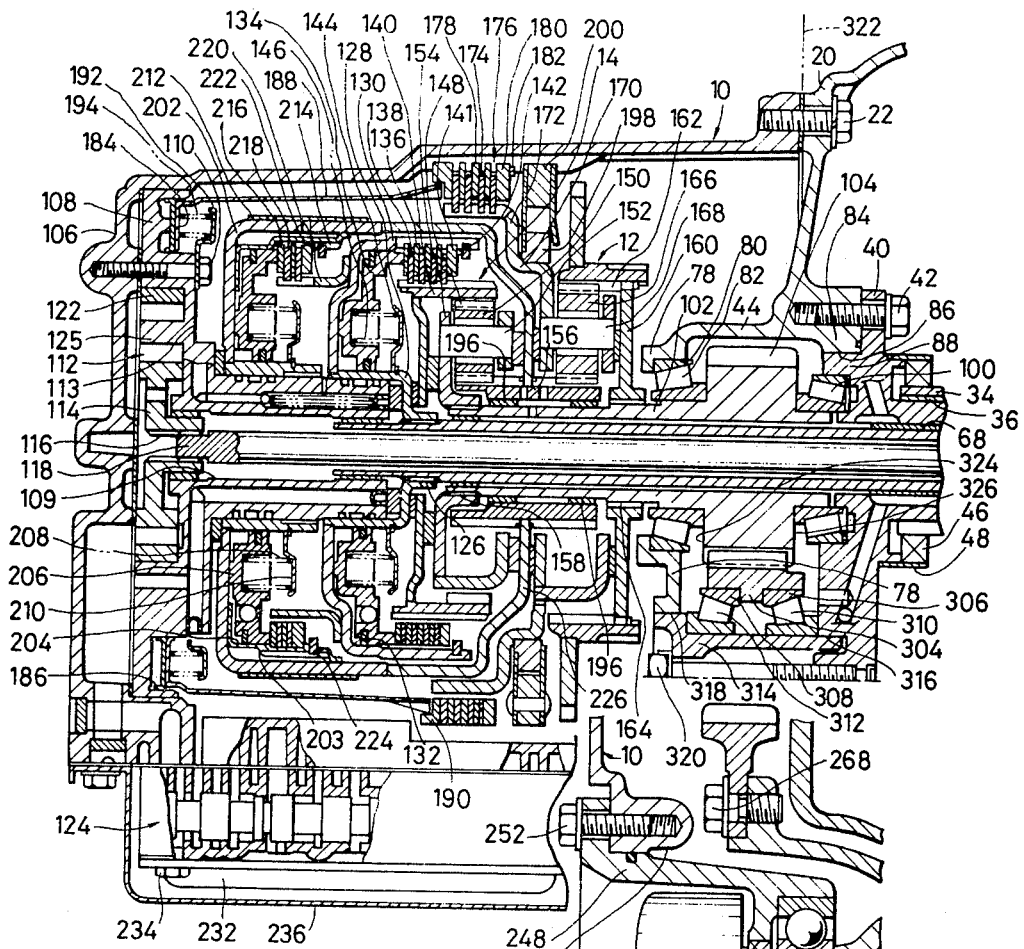
Figure 2A:
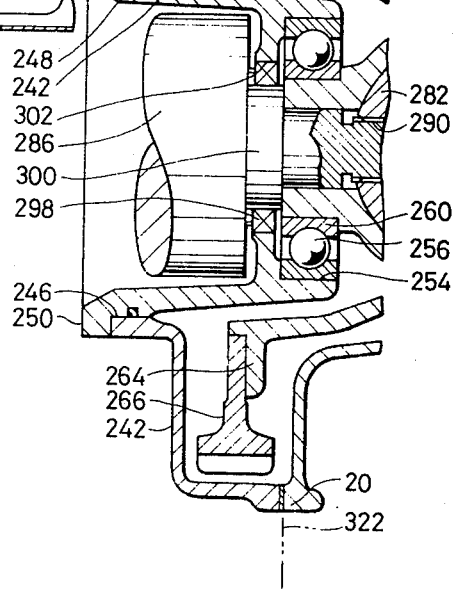

Referring first to FIGS. 1 and 2, numeral 10 designates generally a housing or a transmission case for a planetary gear system. The gear system includes two planetary gear units 12 and 14 which establish the power flow paths as subsequently will be explained.

A hydrokinetic torque converter unit is designated generally by reference numeral 16. It is enclosed within a housing 18 including an end flange 20 which may be secured to one end of transmission case by bolts 22 or any other suitable technique.

Although not shown, a crankshaft for the internal combustion engine may be bolted to a drive plate which is secured to an impeller shell part 24.

Impeller shell part 24 is generally toroidal in form and welded at its inner periphery to a pilot element 26.

The outer periphery of impeller shell part 24 is secured at 28 by welding or by any other suitable fastening technique to a second shell part 30. This shell part also is formed with a generally toroidal shape and its hub 32 is secured to a pilot sleeve shaft 34.

Sleeve shaft 34 is journaled by means of a bushing 36 upon a stationary sleeve shaft extension 38 of an adaptor 40. The adaptor is secured by means of bolts 42 to a housing portion 44 which forms a part of the torque converter housing 18. A suitable fluid seal 46 is situated between the sleeve shaft 34 and a surrounding opening of a ring 48 secured to the adaptor 40.

The impeller is identified in FIG. 1 by the symbol I. It includes blades 50 which are secured at their outer margins to the interior of the shell part 30. An inner shroud 52 is secured to the inner margins of the blades 50 thereby completing radial outflow passages. The flow exit region of the impeller is situated directly adjacent the flow entrance region of a turbine that is generally identified in FIG. 1 by the symbol T. The turbine includes an outer shroud 54, an inner shroud 56 and turbine blades 58 situated between the shrouds. Blades cooperate with the shrouds to define radial inflow passages.

The inner periphery 60 of the shroud 54 is secured to a hub 62. This hub in turn is internally splined at 64 to a power input shaft 66. Turbine shaft 66 is supported by means of a bushing 68 upon stationary sleeve shaft extension 38.

A bladed stator S is disposed between the flow exit region of the turbine and the flow entrance region of the impeller. It includes stator blades 70 carried by a stator shroud 72.

A one-way clutch designated by reference numeral 74 has its outer race secured within an opening of stator shroud 72 and its inner race splined at 76 to the stationary sleeve shaft 38. With the one-way clutch, rotation of the stator in a direction opposite to the direction of rotation of the impeller is prohibited although freewheeling motion in the other direction is accommodated.

Housing portion 44 includes an end wall 78 having a bearing opening 80 within which is situated a tapered roller bearing 82. The housing portion also includes a wall 84 having an opening 86 to receive a bearing retainer portion 88 of the adaptor 40. Another tapered roller bearing 100 is disposed within the retainer portion 88.

The inner races of the bearings 82 and 100 support a power output sleeve shaft 102. This shaft has a power output pinion or an output gear 104.

The left hand end of housing 10, as viewed in FIG. 1 has an end closure wall or generally circular closed end 106. Secured to the inner surface of the end wall 106 is an adaptor 108 having an axially extending sleeve shaft portion 109. The connection between adaptor 108 and end wall 106 can be made by bolts 110.

A fluid pressure pump 112 includes a housing 113. A pump inner gear 114 is disposed in the housing 113 and splined at 116 to a pump drive shaft 118. This shaft 118 extends through the center of sleeve shaft 66 and is keyed or splined at its right hand end, as viewed in FIG. 1, to a hub 120 secured to the inner periphery of the impeller shell part 24.

A pump outer gear 122 also received within the housing 113 meshes with pump inner gear 114 and cooperates with suitable ports to provide a control pressure source that is utilized by a control valve assembly or body designated generally by reference numeral 124. The reference numeral 125 indicates a crescent portion to which the teeth of gears 114 and 122 are in close proximity.

The power input shaft 66 is splined at 126 to a clutch member 128. This member includes a portion that surrounds the end of the axially extending sleeve shaft portion 109, a wall portion 129 radially extending from that surrounding portion and a radially extending portion that defines a drum 130 axially extending and joining to the wall portion. A portion of the inner periphery of the drum joining to the wall portion forms a cylinder 132, and it receives an annular piston 134. The drum 130 is splined to permit a splined connection with one or more externally splined clutch plates 136. Cooperating internally splined plates 138 are carried drivably by an externally splined clutch member 140. A clutch back-up plate 141 is also externally splined to the drum 130 and held axially fast by a snap ring 142.

Fluid pressure may be admitted to the working chamber defined by the piston 134 and the cylinder 132.

Member 128 carries a spring back-up element 144 and piston return springs 146 are situated between element 144 and the piston 134.

Clutch member 140 is integral with a ring gear 148 of the planetary gear unit 14. Ring gear 148 meshes with planet pinions 150 which are carried by pinion shafts 152. These shafts in turn are supported by a planetary carrier 154.

Pinions 150 mesh also with a sun gear 156. The sun gear is common to the planetary gear units 12 and 14.

Planetary carrier 154 is splined at 158 to the power output shaft 102.

A suitable torque transfer member 160 provides a drive connection between the power output shaft 102 and a ring gear 162 for the planetary gear unit 12. The torque transfer member has a splined central opening 164 within which the power output shaft 102 is splined. Ring gear 162 meshes with planetary pinions 166 which are rotatably supported by pinion shafts 168. A carrier 170 carries the pinion shafts 168 and is integral with a drum 172 which is splined to permit a splined connection with one or more internally splined plates 174 for a low and reverse brake designated generally by reference numeral 176. Cooperating externally splined plates 178 are splined to the housing 10. A brake back-up plate 180 is also externally splined to the housing 10 and held axially fast by a snap ring 182. The brake 176 may be applied and released by means of a piston 184 within a cylinder 186 formed in the adaptor 108. A motion transfer member 188 is provided to establish drive connection between the piston 184 and a pressure plate 190 externally splined to the housing 10.

Fluid pressure may be admitted to the working chamber defined by the piston 184 and the cylinder 186.

Adaptor 108 carries a spring back-up element 192 and piston return springs 194 and are situated between element 192 and the piston 184.

The common sun gear 156 is journaled upon the power output shaft 102 by means of two bushings 196. Carrier 170 carries an inner one-way clutch race 198 which is surrounded by a stationary outer race 200 splined to the housing 10. Spring loaded rollers (no numerals) are disposed between the inner and outer races 198 and 200. With one-way clutch races 198 and 200 and rollers, a one-way braking action for the drum 172 is provided Freewheeling one-way motion of the drum 172 relative to the housing 10 can be accommodated, however.

A brake drum assembly 202 having an outer drum 201 and an inner drum 203 fixed to the outer drum is rotatably supported upon the extension 109. The inner drum 203 defines an annular cylinder 204 within which is positioned an annular piston 206. Piston return springs 208 are situated between piston 206 and a spring seat number 210 which is held axially fast upon the hub of drum 202.

Drum assembly 202 is surrounded by an intermediate speed ratio brake band 212. This brake band can be applied and released by means of a suitable fluid pressure operated servo of conventional construction. A portion of the inner drum is splined as shown at 214 to permit a driving connection with externally splined clutch plates 216. Cooperating internally splined plates 218 are carried by an splined clutch member 220. The clutch member 220 is secured to the clutch member 128 for rotation in unison. A clutch pressure back-up plate 222 is externally splined to the inner drum 203 and held axially fast by a snap ring 224.

Upon introduction of pressure to the cylinder 204, a driving connection between drum assembly 202 and clutch member 220 will be established. Similarly, when fluid pressure is admitted to the cylinder 132, a driving connection is established between drum 130 and clutch member 140. Drum assembly 202 is drivably connected to the common sun gear 156 by means of a drive shell 226. The outer periphery of the drive shell 226 is welded to one end of the outer drum 201 of the drum assembly 202. The inner margin of the shell 226 is splined to the common sun gear 156 as indicated.

The transmission mechanism thus far described in connection with FIG. 1 is adapted to establish three forward driving speed ratios and a single reverse speed ratio.

The impeller of the hydrokinetic torque converter unit 16 is coupled directly to the engine so that a toroidal fluid flow in the torus circuit of the converter unit is established. Turbine torque then is delivered to shaft 66 and hence to clutch member 128. To establish a low speed drive ratio in automatic forward drive range (D), the forward clutch shown in part at 136 and 138 is engaged and the turbine torque is then transferred to the ring gear 148. The sun gear 156 tends to rotate in a backward direction relative to the direction of rotation of ring gear 148. This backward motion, however, causes a forward driving motion of ring gear 162 by reason of the fact that the carrier 170 forms a reaction element transmitting the torque reaction exterted by the one-way clutch shown in part at 198 and 200. The forward motion thus imparted to ring gear 162 is transfereed directly to the power output shaft 102 through torque transfer member 160 and splined connection at 164.

The forward driving torque applied to the carrier 154 is transferred to the power output shaft 102 through splined connection 158. Thus the low speed ratio is characterized by a compounding of the two planetary gear units 12 and 14.

In manual low speed drive range (I), brake 176 is applied in addition to the engagement of the forward clutch, thereby anchoring carrier 170. By this anchoring, reverse torque reaction is provided during a hill braking or coasting condition.

To establish intermediate speed ratio, it merely is necessary to engage intermediate speed ratio brake band 212 in addition to the engagement of the forward clutch, thereby anchoring sun gear 156. The sun gear 156 therefore acts as a reaction member and a forward driving torque then is delivered to carrier 154 as the turbine drives the ring gear 148. The forward motion of the carrier 154, of course, is transferred as before to the power output shaft 102. Gear unit 12 is inoperative under these conditions and the one-way clutch shown in part at 198 and 200 will freewheel.

To establish direct drive high speed ratio, it merely is necessary to release brake band 212 and apply both clutches (high and reverse clutches, 216, 218, forward drive clutches 136, 138) simultaneously. This locks together the planetary gear units 12 and 14 so that they rotate in unison at one to one speed ratio.

Reverse drive is established by applying brake 176 and applying the high-and-reverse clutch (216 and 218). The forward clutch (136, 138) is released and brake band 212 is released. Turbine torque then is delivered to clutch member 220 and transferred directly to the sun gear 156 through drive shell 226. This causes the sun gear 156 to rotate in the direction of rotation of the impeller. Carrier 170, of course, is anchored by the brake 176 and acts as a reaction member. Ring gear 162 is then driven in a reverse direction and its reverse motion is transferred directly to the power output shaft 102 at a reduced speed ratio.

Figure 3:
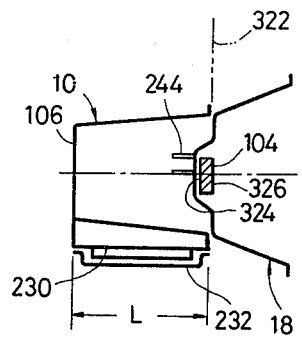
FIG. 3 is a schematic longitudinal sectional view of the automatic transmission shown in FIG. 1.

Referring also to FIGS. 3 to 6, FIG. 5 illustrates a perspective view of housing 10. The housing includes a housing portion 230 having an attachment surface to which a control valve assembly 124 and an oil pan 236 are secured by means of bolts 234 and other suitable means (see FIG. 1). The attachment surface extends longitudinally from a location adjacent to end closure wall 106 to a location adjacent to that end of housing 10 to which housing 18 is secured as shown in FIG. 3.

The oil pan 236 is attached to transmission case 10 as shown in FIG. 1.

A final drive unit including differential is illustrated in FIG. 2. Housing 18 includes a housing portion 238 (see FIGS. 2 and 4) including a bearing opening 240 within which is situated a ball bearing 241. Housing or transmission case 10 includes a housing portion or wall 242 strengthened by one or more ribs 244 as shown in FIGS. 5 and 6. Wall 242 includes an opening 246 to receive a bearing retainer 248. This bearing retainer has at its outer periphery a flange 250 which is secured to wall 242 by means of bolts 252. It includes a bearing opening 254 within which situated is a ball bearing 256.

The inner races 258 and 260 of the bearings 241 and 256 support a differential case 262. Case 262 includes a flange 264 to which an externally toothed final reduction ring gear 266 is secured by means of bolts 268.

A pinion shaft 270 has one and opposite ends 272 and 274 fixed to case 262. A pair of pinions 276 and 278 are rotatably supported by pinion shaft 270. Each pinion meshes with side gears 280 and 282 for axle shafts 284 and 286, respectively. Side gear 280 includes a splined opening 288 within which axle shaft 284 is splined. Side gear 282 also includes a splined opening 290 within which axle shaft 286 is splined.

An oil seal 292 is situated between a reduced diameter section 294 of axle shaft 284 and an opening 296, formed in housing portion 238, surrounding the reduced diameter section. An oil seal 298 is situated between a reduced diameter section 300 and an opening 302, formed in bearing retainer 248, surrounding the reduced diameter section.

Figure 4:
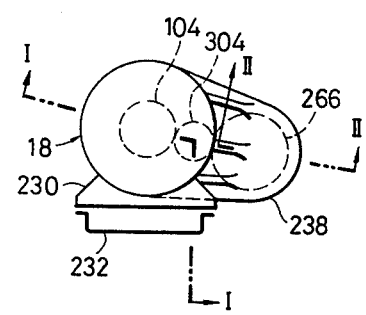
FIG. 4 is a schematic end elevation of the automatic transmission and the differential shown in FIGS. 1 and 2, respectively.

Torque is delivered from output gear 104 to ring gear 266 by means of a pinion or idler gear 304 meshing with the output gear and with the ring gear as shown in FIGS. 4 and 6.

Referring to FIG. 1, idler gear 304 is supported by outer races 306 and 308 of tapered roller bearings 310 and 312. A bearing shaft 314 for supporting the bearings 310 and 312 has one end received in a blined bore 316 formed in adaptor 40 and an opposite end received in an opening 318 formed in end wall 78 of housing 18. Bearing shaft 314 is axially fast by a suitable means indicated at 320.

As will be readily understood from FIGS. 1, 2 and 3, torque converter housing 18 and transmission case 10 are connected to each other to define an interface which lies on a plane, indicated by reference numeral 322, which is disposed outboard of the inboard face 324 of output gear 104 with respect to planetary gear units 12 and 14. A packing may be interposed between end flange 20 and the adjacent end of transmission case 10.

The attachment surface on housing portion 230 is extended up to a plane where the outboard face 326 of output gear 104 lies since this surface may be allowed to be extended, in design, to the end of transmission case 10 secured to flange 20 of torque converter housing 10 and, in this embodiment, the plane 322 where the interface lies is disposed adjacent the outboard face 326.

As will be understood from FIG. 2, housing portion 238 of torque converter housing 18 and wall 242 of transmission case 10 are connected to each other to define an interface which lies in the same plane 322. A packing may be interposed at the interface defined by the housing portion 238 and the wall 242.

Referring to FIGS. 7 and 8, there is shown schematically a conventional transmission housing 400 and cooperating converter housing 402. In these Figures, the same reference numerals as used in FIGS. 1 to 6 are used to designate parts corresponding to the parts used in FIGS. 1 to 6.

As shown in FIG. 7, transmission case 400 and converter housing 402 are connected to each other to define an interface which lies in a plane 404 disposed inboard of the inboard face 324 of an output gear 104 with respect to planetary gear units 12 and 14. Converter housing 402 includes a housing portion 406 enclosing a differential case 262 in cooperation with a side closure wall 408 to close a side opening 410 formed for installing the differential. Housing portion 406 includes a wall remote from transmission case 40. This wall is formed with bearing opening 412 for rotatably supporting a portion of differential case 262. Housing portion 406 also includes a wall adjacent transmission case 400. This wall is also formed with an opening 414 for rotatably supporting another portion of differential case 262.

As shown in FIG. 8, transmission case 400 has a portion 416 formed with an attachment surface to which a valve cover 418 is secured. The attachment surface extends from a location adjacent to an end closure wall 420 of transmission case 400 to a location adjacent the plane 404 that is disposed inboard of the inboard face 324 of the output gear 104 with respect to gear units 12 and 14.

Comparing FIG. 3 with FIG. 8, it will be appreciated that if axial length of the attachment surface of housing portion 230 and axial length of the attachment surface of the housing portion 416 are represented by L and L', respectively, L is longer than L' for a given overall axial length of transmission case and its cooperate converter housing. This means that according to the invention a large area may be prepared for the control valve arrangement thereby making it easy to design control valve assembly and giving freedom in designing a control circuit.

Comparing FIG. 2 with FIG. 7, it will be appreciated that in the differential housing shown in part at 238 and 242 in FIG. 2, wall 242 is strengthened by ribs 244 (see FIG. 5) and there is no opening corresponding to opening 410 shown in FIG. 7, thereby giving good ridigity as compared to differential housing shown in part of at 406 and 408. In the differential housing shown in FIG. 7, it is quite difficult to strengthen wall formed with opening 414 by means of ribs.

Comparing FIGS. 1 and 2 with FIG. 7, it will be appreciated that the differential housing shown in FIG. 2 has no counterpart to side closure wall 408 shown in FIG. 7, thereby contributing to reduction in number in parts and to reduction in manufacturing cost.

What is claimed is:
1. Means for housing
   (a) a hydrokinetic unit,
   (b) a planetary gear system that includes planetary gear elements, a power input element of the planetary gear system being drivably connected to the hydrokinetic unit, a power output element of said planetary gear system having an output gear, the output gear being disposed between the planetary gear elements and the hydrokinetic unit and having an inboard face facing the planetary gear elements and an outboard face facing the hydrokinetic unit, the power output element being rotatably supported by inboard and outboard bearings located respectively on the inboard and outboard sides of the output gear, clutch means for connecting together two elements of the planetary gear system for rotation in unison, brake means for anchoring one element of the planetary gear system, fluid pressure operated servos for actuating the clutch means and the brake means, and a fluid pressure pump drivably connected to the hydrokinetic unit,
   (c) a control valve assembly in communication with the fluid pressure pump for supplying selectively fluid pressure to said servos, and
   (d) a fluid drive unit including a differential connected to the output gear of the power output element of the planetary gear system,
   said housing means comprising:
   a first housing receiving therein said hydrokinetic unit; and
   a second housing having a longitudinal wall and an end wall and receiving therein said planetary gear elements,
   said first and second housings being connected to each other to define an interface which lies in a plane disposed outboard of said inboard face of said output gear, said first housing having a protruding portion extending across said interface into said second housing to contain said output gear and to provide the sole radial and axial support for said inboard bearing.
2. Housing means as claimed in claim 1, in which said first housing includes a housing portion supporting a portion of said differential,
   said second housing includes a housing portion having a wall extending transversely from said longitudinal wall and formed with an opening and includes a member received by said opening and supporting another portion of said differential; and
   said housing portions of said first and second housings are connected to each other to define said interface.
3. Housing means as claimed in claim 1, in which said second housing has an attachment surface extending between said end wall and said plane on which said interface lies, said attachment surface being connected to said control valve assembly.

4. Housing means as claimed in claim 2, in which said second housing has at least one integral rib extending between said longitudinal wall and said transversely extending wall.

5. In a vehicle transmission having a hydrokinetic unit, a planetary gear unit connected to said hydrokinetic unit through an input shaft and a final drive unit connected to said planetary gear unit through an idler gear which meshes with an output gear carried on an output shaft of said planetary gear unit, a first housing unit formed with integral first and second inversely oriented bell portions, said first and second bell portions each having a mouth and a head and being free of undercut portions between the mouths and heads thereof, the respective longitudinal axes of said first and second bell portions being substantially parallel, said first bell portion receiving said hydrokinetic unit therein and said second bell portion receiving said final drive unit therein, a second housing unit formed with an integral third bell portion and cover member, said third bell portion receiving therein said planetary gear unit, said second housing unit being connectable to said first housing unit so that the mouth of said third bell portion encloses part of the head of said first bell portion and contacts said first bell portion to define an interface which lies on a plane, so that the longitudinal axis of said third bell portion is substantially aligned with the longitudinal axis of said first bell portion and so that the cover member closes the mouth of said second bell portion;

a first single piece support member for supporting said hydrokinetic unit which is so constructed and arranged as to be detachably connected to the interior of said first bell portion to close off a portion thereof and thus define a chamber in the head of said first bell portion which is inboard of said hydrokinetic unit, said chamber housing said output gear, said first support member being formed with a through bore through which said input shaft is disposed;

a first bearing which is disposed in an annular recess defined about a first aperture formed in the head of said first bell portion and through which said input and output shafts extend, said annular recess being arranged so that said first bearing can be placed thereinto only through the mouth of said first bell portion;

a second bearing disposed in the mouth of said through bore which is exposed to said chamber; said first and second bearings supporting said output gear within said chamber so that the face of the output gear which faces the planetary gear unit lies on the planetary gear side of said plane;

a cylindrical support member which rotatably supports said idler gear and which is mounted at one end to said first bell portion and at the other end to said support member; and a control valve assembly for controlling said planetary gear unit disposed on a mounting site on the lower side of said third bell portion, said mounting site extending from said plane to the end of said third bell portion so as to maximize the length available for said assembly without increasing the overall length of the interconnected first and second housing units.

* * * * *

UNITED STATES PATENT AND TRADEMARK OFFICE
CERTIFICATE OF CORRECTION

PATENT NO. : 4,271,721

DATED : June 9, 1981

INVENTOR(S) : Takahiro Yamamori, Kazuyoshi Iwanaga and Kunio Ohtsuka

It is certified that error appears in the above-identified patent and that said Letters Patent are hereby corrected as shown below:

On The Front Page

Insert the following:

[30]  Foreign Application Priority Data
      Sept. 18, 1978 [JP]   Japan ............53-114940

Signed and Sealed this

First Day of December 1981

|SEAL|

Attest:

GERALD J. MOSSINGHOFF

*Attesting Officer*     *Commissioner of Patents and Trademarks*